M. MASON.
COUPLING DEVICE FOR TRAILERS.
APPLICATION FILED SEPT. 24, 1921.

1,419,398.

Patented June 13, 1922.

Inventor
Mell Mason
By Watson E. Coleman, Attorney

UNITED STATES PATENT OFFICE.

MELL MASON, OF EXETER, CALIFORNIA.

COUPLING DEVICE FOR TRAILERS.

1,419,398.   Specification of Letters Patent.   Patented June 13, 1922.

Application filed September 24, 1921. Serial No. 502,927.

*To all whom it may concern:*

Be it known that I, MELL MASON, a citizen of the United States, residing at Exeter, in the county of Tulare and State of California, have invented certain new and useful Improvements in Coupling Devices for Trailers, of which the following is a specification, reference being had to the accompanying drawings.

This invention relates to coupling devices used in hitching together tractors and farm implements or the like and has for its object the provision of a novel coupler designed to be permanently associated with or detachably mounted upon the tongue of the implement or other device to be drawn, the construction being such that the device will efficiently operate to couple together two vehicles or the like in such a way that accidental disconnection will be prevented.

An important and more specific object is the provision of a device of this character which when in coupling position is spring pressed to maintain such position, the parts being, however, very easily movable to effect disconnection when desired.

An additional object is the provision of a device of this character which will be simple and inexpensive in manufacture, easy to install and use, highly efficient in service, durable, and a general improvement in the art.

With the above and other objects and advantages in view, the invention consists in the details of construction to be hereinafter more fully described and claimed, and illustrated in the accompanying drawings, in which:

Figure 2 is a plan view showing it in operative position and in association with the draw bar of a tractor or the like;

Figure 1:
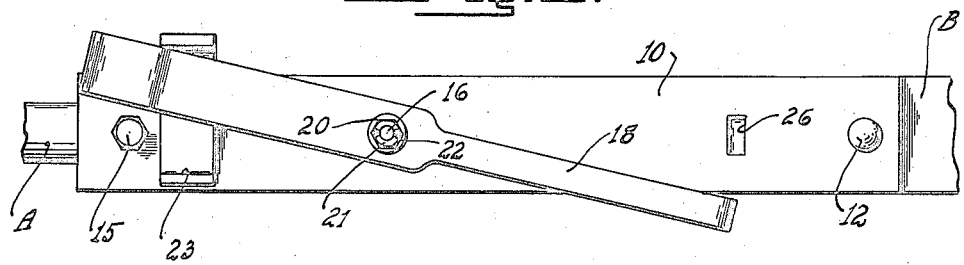
Figure 1 is a plan view of the device in released position.
Figure 2:
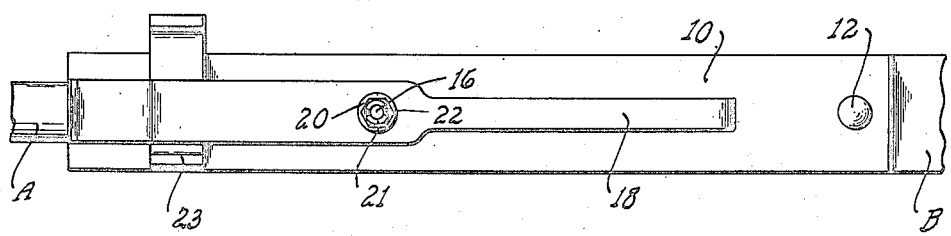
Figure 3:
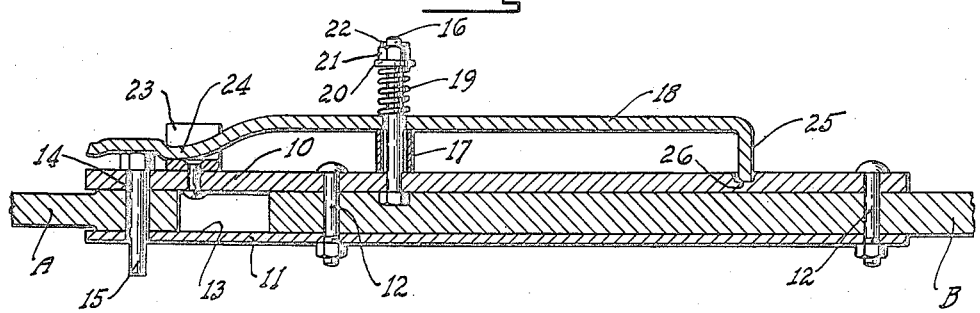
Figure 3 is a longitudinal section.
Figure 4:
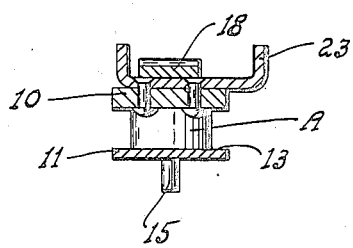
Figure 4 is a cross sectional view.

Referring more particularly to the drawings, the letter A designates the draw bar of a tractor and B designates the tongue of the implement to be drawn. In carrying out my invention I provide elongated metal plates 10 and 11 secured upon the upper and lower sides of the tongue B as by means of suitable bolts 12. These plates extend beyond the end of the tongue to define a bifurcation 13 which receives the draw bar A and these projecting ends are formed with registering holes 14 for the passage of the coupling bolt 15 which of course passes through the draw bar A.

Extending upwardly from the intermediate portion of the plate 10 is a bolt 16 which has its lower portion surrounded by a sleeve or bushing 17. Pivoted upon this bolt is an elongated trigger bar 18 which is pressed toward the plate 10 by a coil spring 19 which encircles the bolt and which abuts against a washer 20 held in place by a nut 21 screwed upon the bolt and held against displacement by a cotter pin 22. The trigger bar 18 is swingable with respect to the tongue and has one end operating along a U-shaped guide 23 which is secured transversely of the projecting end of the plate 10. This end of the trigger bar is offset toward the plate 10, as indicated at 24, and has its free extremity engageable over the head of the coupling bolt 15. The other end of the trigger bar extends laterally toward the plate 10, as shown at 25, and is engageable within a recess 26 therein for the purpose of holding the trigger bar against swinging movement when it is in operative position.

The operation of the device is as follows: Assuming that my coupling device is in its released position, as shown in Figure 1, in order to couple together the tractor and the implement to be drawn, or a trailer and a motor vehicle or in fact any two vehicles or implements, the draw bar A is inserted within the bifurcation 13 and the bolt 15 is passed through the holes 14 and through the usual hole in the draw bar. The operator then grasps the trigger bar 18 and pulls it upwardly against the resistance of the spring 19 and at the same time swings it so that the downwardly offset end 24 will engage over the head of the coupling bolt 15. When this is done the lateral extension 25 will be in register with the recess 26 so that when upward pressure upon the trigger bar is relieved the extension 25 will engage within the recess 26 so as to hold the trigger bar against swinging movement and in such position that upward displacement of the coupling bolt 15 will be positively prevented. Uncoupling is of course accomplished just as easily but in a reverse manner as will be readily apparent.

From the foregoing description and a study of the drawings it will be apparent that I have thus provided a simply constructed and consequently inexpensive and easily applied coupling device by which two implements, vehicles or the like may be coupled together securely so that any accidental disconnection will be positively prevented. Owing to the fact that it is unnecessary to apply any bolts, nuts or the like in the coupling operation it will be apparent that the device will be a great time and labor saver. Owing to the simplicity it is to be noted that there is practically nothing to get out of order and that the device should consequently have an extremely long life.

While I have shown and described the preferred embodiment of the invention, it is of course to be readily understood that I reserve the right to make such changes in the form, construction and arrangement of parts as will not depart from the spirit of the invention or the scope of the sub-joined claims.

Having thus described my invention, I claim:

1. Retaining means for a coupling bolt comprising a trigger bar pivoted intermediate its ends and having one end engageable over the top of the coupling bolt, spring means urging the trigger bar into engagement with the bolt, a coupling element carrying the trigger bar, the associated coupling member being formed with a recess and the trigger bar being formed with a down turned end engageable within said recess for preventing swinging of the trigger bar.

2. Retaining means for a coupling bolt connecting a pair of coupling elements comprising an upstanding bolt carried by one coupling element, a trigger bar pivoted upon said upstanding bolt above the trigger bar for forcing the latter downwardly toward the associated coupling element, one end of the trigger bar being engageable over the coupling bolt and the other end being formed with a down turned projection, the associated coupling element being formed with a recess receiving said down turned projection preventing swinging of the trigger bar, and a U-shaped guide secured upon the top of said associated coupling element for limiting swinging movement of the trigger bar in both directions.

In testimony whereof I hereunto affix my signature.

MELL MASON.